(12) United States Patent
Stevens et al.

(10) Patent No.: US 8,104,743 B2
(45) Date of Patent: Jan. 31, 2012

(54) PULL STRING INSTALLATION DEVICE FOR ELECTRICAL SYSTEM RACEWAYS

(76) Inventors: David Brian Stevens, Las Vegas, NV (US); Bruce Alan Drummond, Hobart, IN (US)

( * ) Notice: Subject to any disclaimer, the term of this patent is extended or adjusted under 35 U.S.C. 154(b) by 446 days.

(21) Appl. No.: 12/454,445

(22) Filed: May 18, 2009

(65) Prior Publication Data

US 2009/0302286 A1    Dec. 10, 2009

Related U.S. Application Data

(60) Provisional application No. 61/130,896, filed on Jun. 4, 2008.

(51) Int. Cl.
*H02G 1/08*    (2006.01)
(52) U.S. Cl. ................. 254/134.3 R
(58) Field of Classification Search ........... 254/134.3 R, 254/134.3 FT, 134; 226/92
See application file for complete search history.

(56) References Cited

U.S. PATENT DOCUMENTS

| | | | | |
|---|---|---|---|---|
| 3,479,013 A | * | 11/1969 | Williams | ............. 254/134.3 R |
| 3,908,799 A | * | 9/1975 | Valeriano | ................ 184/38.1 |
| 4,083,533 A | | 4/1978 | Schwabe | |
| 4,514,004 A | * | 4/1985 | Morgan | ............. 254/134.3 R |
| 4,715,747 A | | 12/1987 | Behrens | |
| 5,915,770 A | * | 6/1999 | Bergstrom | ................. 294/174 |
| 7,360,752 B2 | | 4/2008 | Watkins | |
| 2005/0173686 A1 | * | 8/2005 | Diggle et al. | ........ 254/134.3 FT |
| 2008/0116429 A1 | * | 5/2008 | Mallory | ............. 254/134.3 FT |

* cited by examiner

*Primary Examiner* — David B Thomas

(57) ABSTRACT

The pull string installation device can be described as a torsion spring having a pair of tangential legs, with each leg having a formed protrusion for engaging a fish tape eyelet, and one leg having a looped end adapted for the receiving and securing of a pull string. When used in conjunction with a fish tape, the pull string installation device receives, secures, and installs a pull string into an electrical system raceway, to aid in the future installation of conductors or cables.

10 Claims, 5 Drawing Sheets

PULL STRING INSTALLATION DEVICE FOR ELECTRICAL SYSTEM RACEWAYS

CROSS-REFERENCE TO RELATED APPLICATIONS

This application claims the benefit of U.S. Provisional Patent Application Ser. No. 61/130,896, filed Jun. 4, 2008.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates generally to electrical system installation equipment, and more specifically to a pull string installation device for electrical system raceways.

There are times when it is necessary or desirable to install a pull string within an electrical system raceway prior to the installation of conductors or cables. Installing a pull string within an electrical system raceway aids in the future installation of conductors or cables. An electrical system raceway has two ends and a properly installed pull string will have sufficient length extending from one end of the electrical system raceway to attach conductors or cables, and have sufficient length extending from the opposite end of the electrical system raceway for a worker or machine to grab and withdraw the pull string and install any attached conductors or cables within the electrical system raceway.

A variety of pull string installation devices have been made, however there are two main problems associated with the devices that are readily available, which are, the cost of the installation devices and their requirement for electricity to operate. Besides expensive devices that were specifically designed for the installation of a pull string, there is an alternative labor-intensive method for installing a pull string, which is as follows. To begin the installation of a pull string, a worker pushes a fish tape through an electrical system raceway. The worker then walks to the opposite end of the raceway from where the fish tape entered the electrical system raceway and attaches the pull string to the fish tape eyelet. Afterwards, the worker must then walk back to where the fish tape entered the electrical system raceway and pull the fish tape out of the electrical system raceway, thus installing the pull string within the electrical system raceway. Additionally, the worker must then detach the pull string from the fish tape.

BRIEF SUMMARY OF THE INVENTION

The present invention is an inexpensive pull string installation device for electrical system raceways, which can be used to aid in the future installation of conductors or cables. With a pull string removably attached to the pull string installation device, the pull string installation device can be removably engaged with an eyelet end of a fish tape and pushed through an electrical system raceway. Upon exiting the electrical system raceway, the pull string installation device disengages from the eyelet end of the fish tape, allowing fish tape removal and completing the installation of the pull string within the electrical system raceway.

Accordingly, several objects and advantages of the current invention are as follows.

An object of the invention is to provide a new and improved pull string installation device for electrical system raceways.

Another object of the invention is to provide a new and improved pull string installation device that can be utilized for several different types of electrical system raceways.

A further object of the invention is to provide a new and improved pull string installation device that can remain in place until conductors or cables are to be installed within the electrical system raceway.

A further object of the invention is to provide a new and improved pull string installation device that is relatively easy to install and remove.

A further object of the invention is to provide a new and improved pull string installation device that has a high degree of integral strength.

A further object of the invention is to provide a new and improved pull string installation device that is rigid enough to allow reuse.

A yet further object of the invention is to provide a new and improved pull string installation device that can be easily and inexpensively manufactured.

Further objects and advantages of the invention will become apparent from a consideration of the drawings and ensuing description.

DETAILED DESCRIPTION OF THE INVENTION

Figure 1:
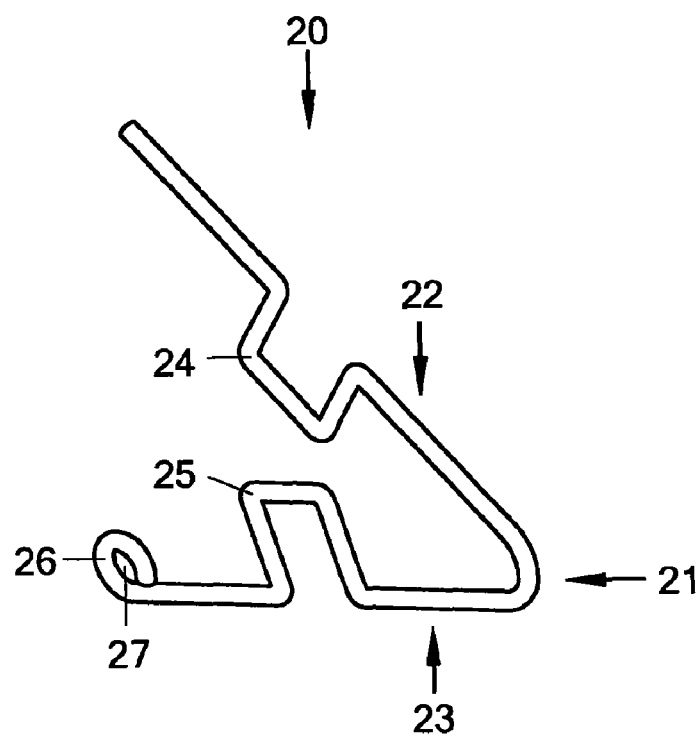
FIG. 1 is a front isometric view of the present invention.
Figure 2:
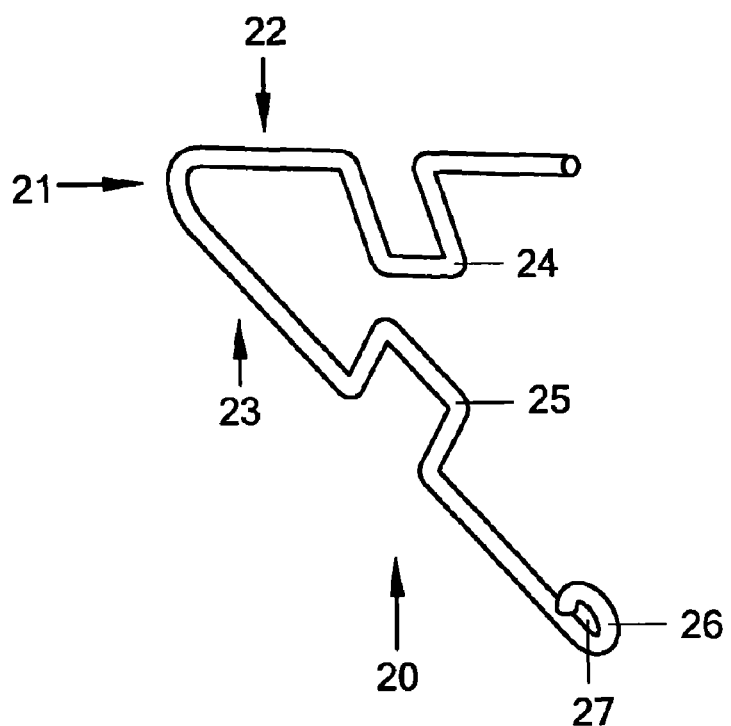
FIG. 2 is a rear isometric view of the present invention.

In the following description, like parts are marked throughout the specification and drawing figures with the same reference numerals, respectively. The drawing figures are not necessarily to scale and certain features may be shown in somewhat a generalized form in the interest of clarity. Referring now to FIG. 1 and FIG. 2, there is shown a pull string installation device constructed according to the teachings of the present invention, the pull string installation device being generally indicated by the reference numeral 20. As will be described further in detail below, used in conjunction with a fish tape, the pull string installation device 20 is designed for use in receiving, securing, and installing a pull string into an electrical system raceway to aid in the future installation of conductors or cables. An electrical system raceway is conventionally known to one skilled in the art as conduit. Conduit is generally round and is available in a wide variety of sizes as specified by a nominal inside diameter. A fish tape is commonly used to install wires, cables, or a pull string within conduit. The fish tape is conventionally known to one skilled in the art as a fish tape. Most fish tapes have an eyelet with a receiving aperture for attaching conductors, cables, or a pull string. Since conduit is available in a wide variety of sizes, the pull string installation device 20 is generally constructed for utilization in an electrical system raceway that has a specified nominal inside diameter and a specified actual inside diameter, which means that the size of the pull string installation device 20 should coincide with a conduit having the specified actual inside diameter. Additional consideration must be given to the size of the receiving apertures of the eyelets of fish tapes that are commonly available.

The pull string installation device 20 is generally constructed from but not limited to an elongated portion of round spring wire, however, it is to be understood that the pull string installation device 20 could be made of any flexible, resilient, and durable material, such as plastic, having other than a round cross section, without departing from the spirit of the present invention. Furthermore, as the following discussion proceeds, the pull string installation device 20 will be described as being formed from a series of bends in a straight portion of spring wire, however, it is to be understood that the pull string installation device 20 could be constructed from plastic through an injection molding process, without departing from the spirit of the present invention. Furthermore, it is also to be understood that the suggested configuration of bends and angles are only for the purpose of this discussion and that other configurations of bends and angles may be utilized to accomplish the same task without departing from the spirit of the present invention.

The pull string installation device 20 is generally of an open V-shape form having a nose portion 21 that is generally indicated, an upper leg portion 22 that is generally indicated, and a lower leg portion 23 that is generally indicated. The nose portion 21 integrally joins the upper leg portion 22 and the lower leg portion 23. The upper leg portion 22 has an integrally joined upper leg fish tape eyelet engaging protrusion 24 that faces toward the lower leg portion 23. The lower leg portion 23 has an integrally joined lower leg fish tape eyelet engaging protrusion 25 that faces toward the upper leg portion 22. Additionally, the lower leg portion 23 has an integrally joined lower leg eyelet end 26 and the integrally joined lower leg eyelet end 26 has a pull string receiving aperture 27.

Referring now to FIG. 1, as viewed by the human eye, the nose portion 21, the upper leg portion 22, the lower leg portion 23, the integrally joined upper leg fish tape eyelet engaging protrusion 24, the integrally joined lower leg fish tape eyelet engaging protrusion 25, and the integrally joined lower leg eyelet end 26 are all substantially on the same vertical plane.

As previously mentioned, for the sake of discussion and to provide a thorough understanding pertaining to the construction of the pull string installation device 20, the pull string installation device 20 shall be described as being constructed from a straight portion of spring wire, having a predetermined cross sectional diameter and a predetermined length, with an upper end and a lower end. The pull string installation device 20 shall be further described as being bent at predetermined locations along the predetermined length to form predetermined angles. The direction of the bends shall be described in a clockwise and counterclockwise rotation, and the individual amount of bending for each bend shall be indicated in degrees. Additionally, the integrally joined lower leg eyelet end 26 is generally round and will be described as bending a loop, however, it is to be understood that the integrally joined lower leg eyelet end 26 could be constructed from any configuration of bends which provide a means for receiving and securing a pull string without departing from the spirit of the invention. It is worth noting, that when bending spring wire, all bends will have a minimum radius that is dependent upon the characteristics of the wire being bent. In the following discussion, the radius of all bends has been omitted and will be apparent to those skilled in the art. Upon completion of discussing all the necessary bends, as viewed by the human eye, the nose portion 21, the upper leg portion 22, the lower leg portion 23, the integrally joined upper leg fish tape eyelet engaging protrusion 24, the integrally joined lower leg fish tape eyelet engaging protrusion 25, and the integrally joined lower leg eyelet end 26 will all be substantially on the same vertical plane. To begin construction, the upper end and the lower end of the spring wire are positioned on the same vertical plane, with the lower end being positioned on a lower horizontal plane and the upper end being positioned on a upper horizontal plane, in a manner that the spring wire extends upward from the lower horizontal plane from left to right at substantially a twenty-five-degree angle. The lower end of the spring wire is bent in a clockwise direction until it forms an enclosed loop being identified as the integrally joined lower leg eyelet end 26 of the pull string installation device 20. The integrally joined lower leg eyelet end 26 has a predetermined inner diameter and a predetermined outer diameter. The predetermined inner diameter is generally slightly larger than the diameter of commonly available pull string. Next, a first series of four ninety-degree bends will form the integrally joined lower leg fish tape eyelet engaging protrusion 25 of the pull string installation device 20. There are two things that must be considered when forming the integrally joined lower leg fish tape eyelet engaging protrusion 25, one is the specified actual inside diameter of the conduit and the other is the size of receiving apertures of the eyelets of fish tapes that are commonly available. Now heading toward the upper end of the spring wire to a first predetermined distance from the last bending operation, a first ninety-degree bend is made in a counterclockwise direction. Now heading toward the upper end of the spring wire to a second predetermined distance from the last bending operation, a second ninety-degree bend is made in a clockwise direction. The second predetermined distance from the first ninety-degree bend to the second ninety-degree bend should be slightly less than the specified actual inside diameter of the conduit. Now heading toward the upper end of the spring wire to a third predetermined distance from the last bending operation, a third ninety-degree bend is made in a clockwise direction. The third predetermined distance from the second ninety-degree bend to the third ninety-degree bend should be slightly less than the size of receiving apertures of fish tapes that are commonly available. Now heading toward the upper end of the spring wire to a fourth predetermined distance from the last bending operation, a fourth ninety-degree bend is made in a counterclockwise direction. The fourth predetermined distance from the third ninety-degree bend to the fourth ninety-degree bend should be equal to the second predetermined distance. Now heading toward the upper end of the spring wire to a fifth predetermined distance from the last bending operation, a fifty-degree bend is made in a counterclockwise direction. The fifty-degree bend forms the nose portion 21 of the pull string installation device 20. Next, a second series of four ninety-degree bends will form the integrally joined upper leg fish tape eyelet engaging protrusion 24 of the pull string installation device 20. Now heading toward the upper end of the spring wire to a sixth predetermined distance from the last bending operation, a fifth ninety-degree bend is made in a counterclockwise direction. The sixth predetermined distance from the fifty-degree bend to the fifth ninety-degree bend should be equal to the fifth predetermined distance. Now heading toward the upper end of the spring wire to a seventh predetermined distance from the last bending operation, a sixth ninety-degree bend is made in a clockwise direction. The seventh predetermined distance from the fifth ninety-degree bend to the sixth ninety-degree bend should be equal to the second predetermined distance and the fourth predetermined distance. Now heading toward the upper end of the spring wire to a eighth predetermined distance from the last bending operation, a seventh ninety-degree bend is made in a clockwise direction. The eighth predetermined distance from the sixth ninety-degree bend to the seventh ninety-degree bend should be equal to the third predetermined distance. Now heading toward the upper end of the spring wire to a ninth predetermined distance from the last bending operation, a eighth ninety-degree bend is made in a counterclockwise direction. The ninth predetermined distance from the seventh ninety-degree bend to the eighth ninety-degree bend should be equal to the second predetermined distance, the fourth predetermined distance, and the seventh predetermined distance. Now heading toward the upper end of the spring wire to a tenth predetermined distance from the last bending operation the upper end of the spring wire is reached. The tenth predetermined distance is slightly less than being equal to the first predetermined distance. Upon reaching the upper end of the spring wire, the pull string installation device 20 has been constructed. The constructed pull string installation device 20 can be accurately described as a torsion spring having a pair of tangential legs, with each leg having a formed protrusion for engaging a fish tape eyelet, and one leg having a looped end adapted for the receiving and securing of a pull string.

Figure 3:
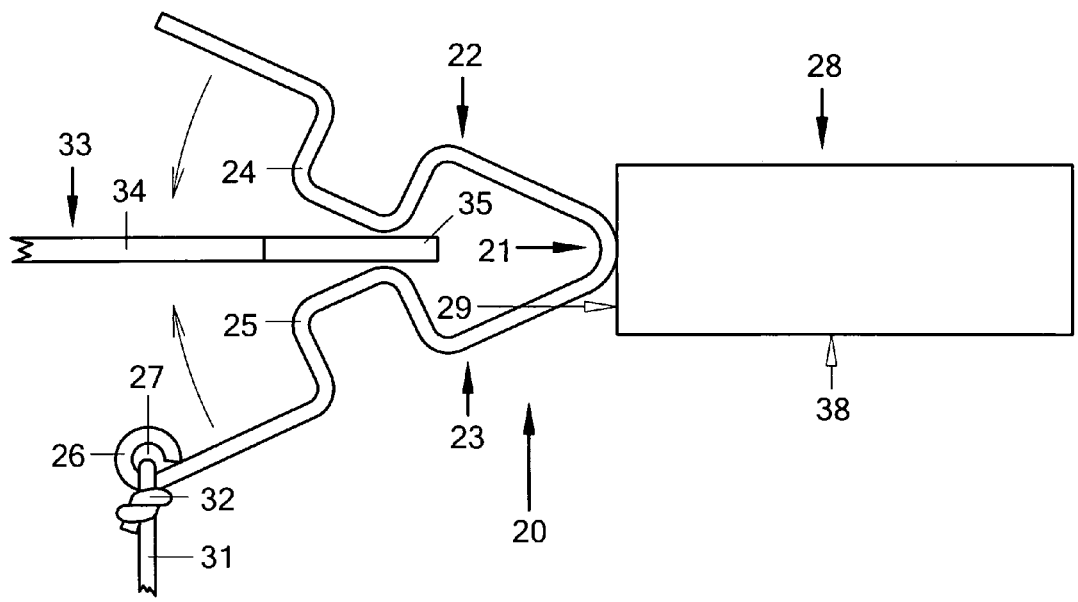
FIG. 3 is a front in-use view of the present invention positioned adjacent to an end of an electrical system raceway and prior to the present invention being engaged with a fish tape eyelet.
Figure 5:
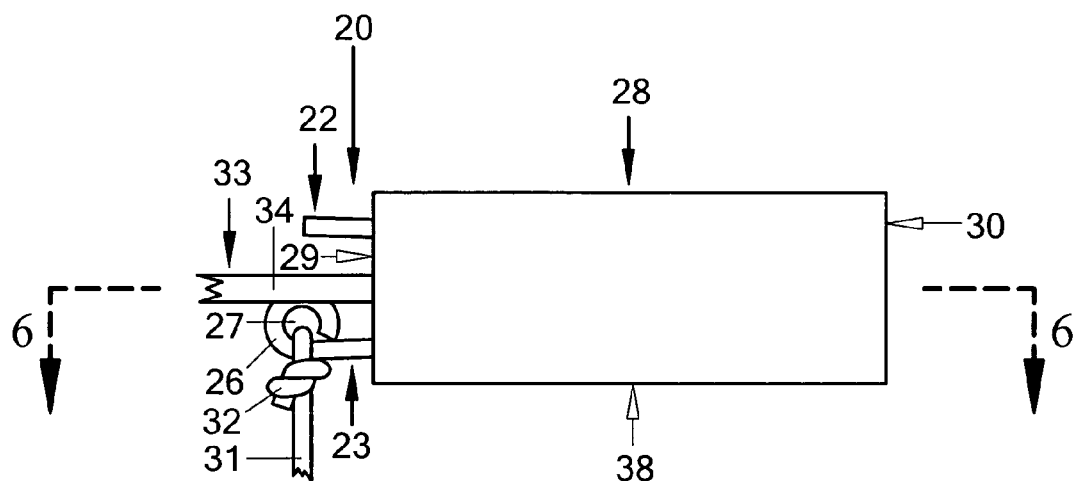
FIG. 5 is a front in-use view of the present invention partially inserted into an electrical system raceway.
Figure 6:
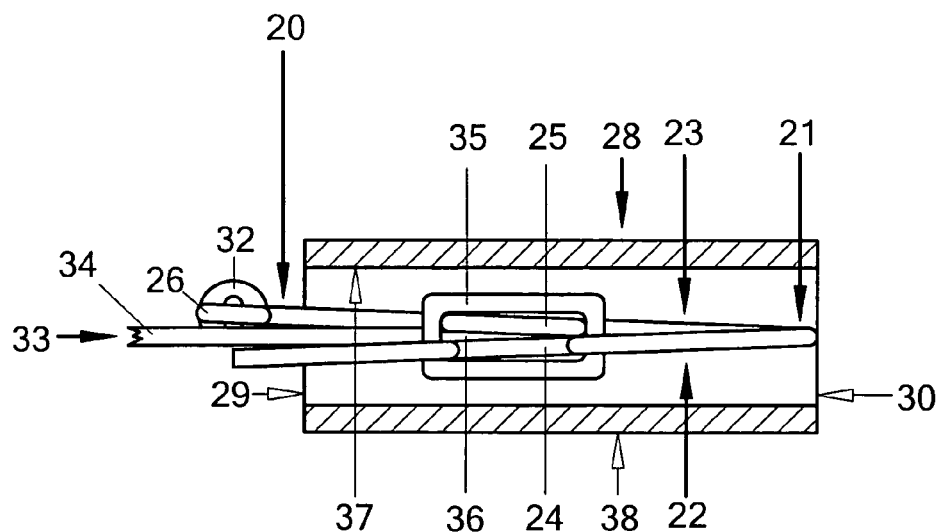
FIG. 6 is a cross sectional in-use view taken along line 6-6 of FIG. 5, depicting the present invention partially inserted into an electrical system raceway.

Referring now to FIG. 3, FIG. 5, and FIG. 6, the pull string installation device 20 is shown as being positioned adjacent to an electrical system raceway 28 that is generally indicated. The electrical system raceway 28 has a front end 29, a rear end 30, and an overall length as the distance measured from front end 29 to the rear end 30. The electrical system raceway 28 is basically some sort of hollow tubing or pipe, and as previously mentioned, it is conventionally known to those skilled in the art as a raceway or conduit. The pull string installation device 20 is shown as having a fragment of a pull string 31 removably attached to the integrally joined lower leg eyelet end 26. The pull string 31 is conventionally known to those skilled in the art as a pull string. The pull string 31 is removably attached to pull string installation device 20 by threading the pull string 31 through the pull string receiving aperture 27 of the integrally joined lower leg eyelet end 26 of the lower leg portion 23, looping the pull string 31 around the integrally joined lower leg eyelet end 26, and tying a simple knot 32, such as an arbor knot. FIG. 3 also shows a fragment of a fish tape 33, which is generally indicated. As previously mentioned, the fish tape 33 is conventionally known to those skilled in the art as a fish tape. The fish tape 33 has a flexible shaft 34 and a fish tape integrally joined eyelet end 35. Although not shown in FIG. 3 or FIG. 5, the fish tape integrally joined eyelet end 35 has an eyelet aperture 36 which can be seen in the cross section of FIG. 6 taken along line 6-6 of FIG. 5.

Figure 4:
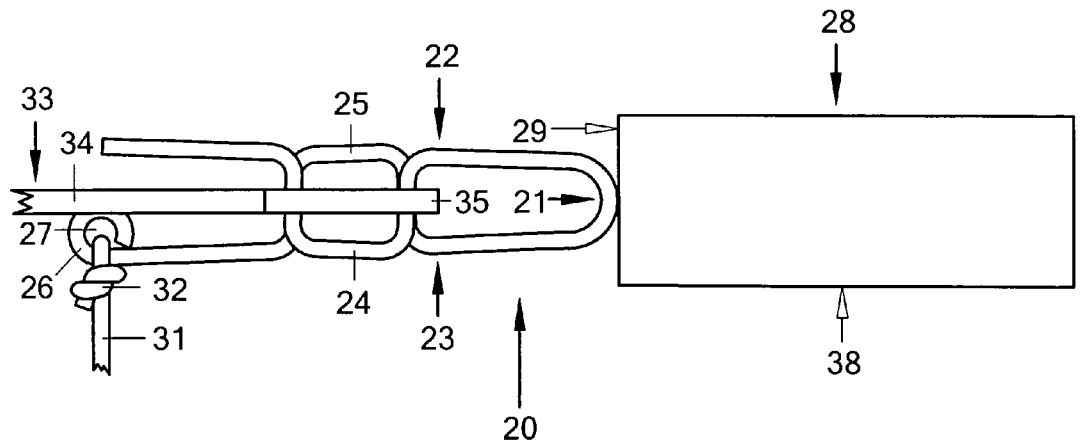
FIG. 4 is a front in-use view of the present invention positioned adjacent to an end of an electrical system raceway, with the present invention removably engaged with a fish tape eyelet.

Referring now to FIG. 3, FIG. 4, FIG. 5, and FIG. 6. In FIG. 3, the fish tape integrally joined eyelet end 35 is shown as being positioned between the integrally joined upper leg fish tape eyelet engaging protrusion 24 and the integrally joined lower leg fish tape eyelet engaging protrusion 25 of the pull string installation device 20. To begin utilizing the pull string installation device 20, the upper leg portion 22 and the lower leg portion 23 should be squeezed and flexed towards each other as indicated in FIG. 3 and in a manner which allows the integrally joined upper leg fish tape eyelet engaging protrusion 24 and the integrally joined lower leg fish tape eyelet engaging protrusion 25 to pass each other and pass through the eyelet aperture 36 of the fish tape integrally joined eyelet end 35 of the fish tape 33 as best seen in FIG. 4 and the cross section of FIG. 6 taken along line 6-6 of FIG. 5. FIG. 4 depicts the pull string installation device 20 as being engaged with the fish tape 33 prior to inserting the pull string installation device 20 into the front end 29 of the electrical system raceway 28. The pull string installation device 20 must be held as shown in FIG. 4 until the pull string installation device 20 is inserted into the front end 29 of the electrical system raceway 28. FIG. 5 depicts the pull string installation device 20 as being engaged with the fish tape 33 and partially inserted into the electrical system raceway 28. In the cross section of FIG. 6 taken along line 6-6 of FIG. 5, it is shown that the electrical system raceway 28 has an inner wall 37 and an outer wall 38. It is also shown that the integrally joined upper leg fish tape eyelet engaging protrusion 24 and the integrally joined lower leg fish tape eyelet engaging protrusion 25 pass through the eyelet aperture 36 of the fish tape integrally joined eyelet end 35 of the fish tape 33.

Figure 7:
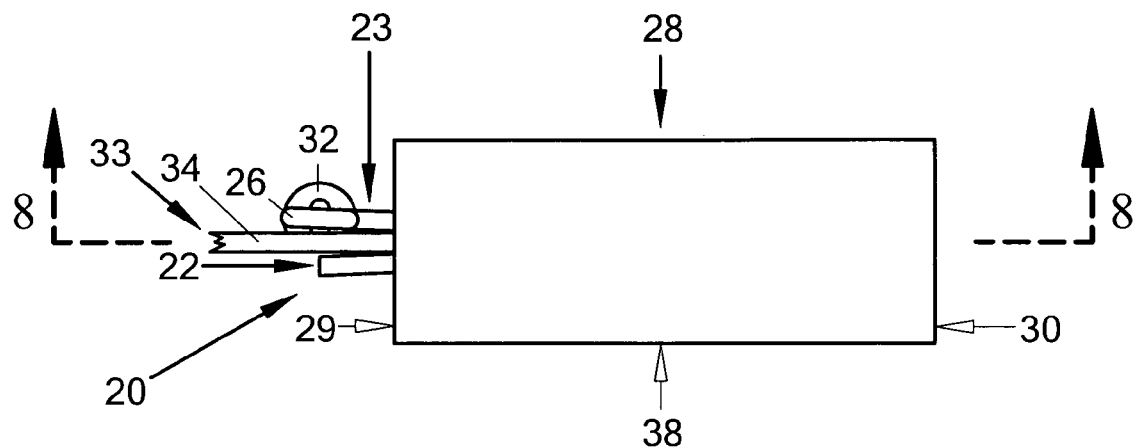
FIG. 7 is a top in-use view of the present invention partially inserted into an electrical system raceway.
Figure 8:
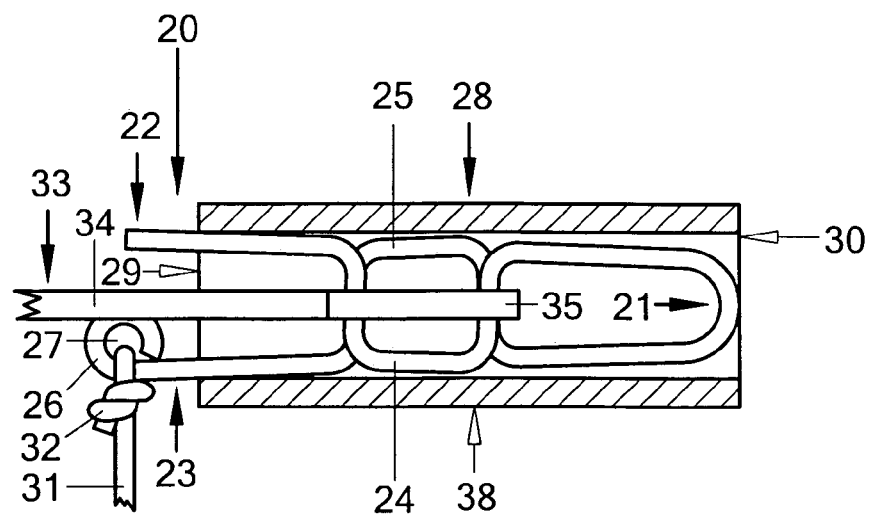
FIG. 8 is a cross sectional in-use view taken along line 8-8 of FIG. 7, depicting the present invention partially inserted into an electrical system raceway.

Referring now to FIG. 7 and FIG. 8, FIG. 7 depicts a top in-use view of the pull string installation device 20 as being engaged with the fish tape 33 and partially inserted into the electrical system raceway 28, and FIG. 8 is a cross section taken along line 8-8 of FIG. 7. As seen in FIG. 8, while inserted in the electrical system raceway 28, the upper leg portion 22 and the lower leg portion 23 are up against the inner wall 37 of the electrical system raceway 28. The pull string installation device 20 exerts spring tension against the inner wall 37 of the electrical system raceway 28, through the upper leg portion 22 and the lower leg portion 23. It is worth noting that while this spring tension exists, the fish tape 33 will remain engaged to the pull string installation device 20 due to the fact that the integrally joined upper leg fish tape eyelet engaging protrusion 24 and the integrally joined lower leg fish tape eyelet engaging protrusion 25 pass through the eyelet aperture 36 of the fish tape integrally joined eyelet end 35 of the fish tape 33.

Referring now to FIG. 5, FIG. 6, FIG. 7, and FIG. 8, with the pull string installation device 20 partially inserted into the electrical system raceway 28, the flexible shaft 34 of the fish tape 33 should be pushed through the electrical system raceway 28 in the direction from the front end 29 to the rear end 30. While pushing the fish tape 33 through the electrical system raceway 28, the fish tape integrally joined eyelet end 35 exerts force upon the integrally joined upper leg fish tape eyelet engaging protrusion 24 and the integrally joined lower leg fish tape eyelet engaging protrusion 25 causing the pull string installation device 20 to move with the fish tape 33 through the electrical system raceway 28, meanwhile the pull string 31 attached to the pull string installation device 20 is being installed in the electrical system raceway 28.

Figure 9:
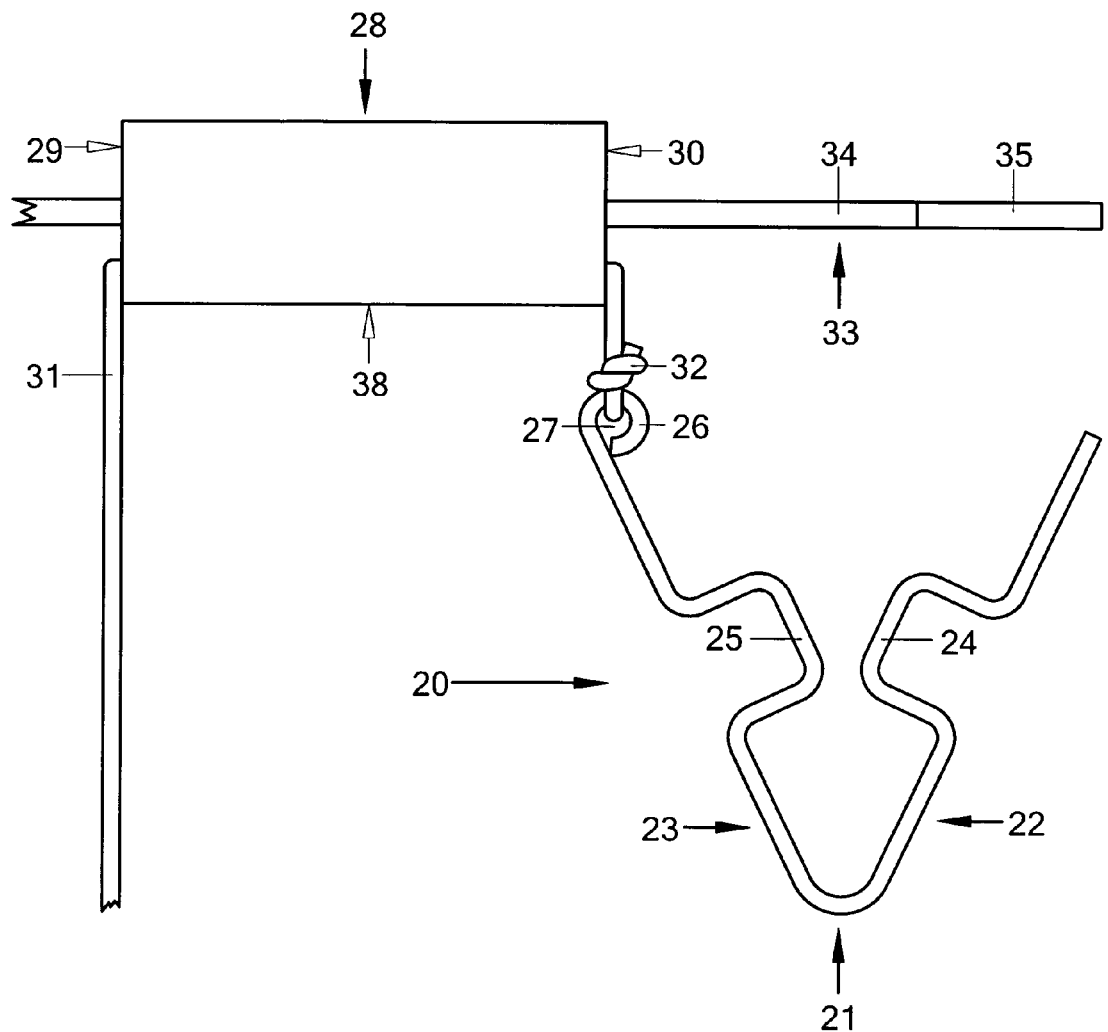
FIG. 9 is a front in-use view of the present invention after it has exited an electrical system raceway and disengaged with a fish tape eyelet end.

Referring now to FIG. 9, the pull string installation device 20 is shown after exiting the rear end 30 of the electrical system raceway 28. The pull string installation device 20 is now shown as no longer being under spring tension and has returned to original form, thus disengaging from the fish tape integrally joined eyelet end 35 of the fish tape 33. Hence, the fish tape 33 can be safely removed, leaving the pull string 31 installed in the electrical system raceway 28.

We claim:

1. A pull string installation device for an electrical system raceway made of durable, flexible, and resilient material, comprising:
   a nose portion,
   an upper leg portion having an integrally joined upper leg fish tape eyelet engaging protrusion wherein said upper leg portion is integrally and tangentially joined to said nose portion,
   a lower leg portion having an integrally joined lower leg fish tape eyelet engaging protrusion and a formed eyelet end with a pull string receiving aperture which is adapted to receive and to secure a pull string wherein said lower leg portion is integrally and tangentially joined to said nose portion, and wherein
   said pull string installation device can be removably engaged with an eyelet end of a fish tape having an aperture by squeezing and flexing said upper leg portion toward said lower leg portion in a manner that said integrally joined upper leg fish tape eyelet engaging protrusion and said integrally joined lower leg fish tape eyelet engaging protrusion pass through said aperture of said eyelet end of said fish tape, and wherein said pull string installation device will remain removably engaged with said eyelet end of said fish tape while inserted in a predetermined size of said electrical system raceway, and wherein
   said pull string installation device becomes disengaged from said eyelet end of said fish tape upon being removed or exiting from said electrical system raceway.

2. The pull string installation device of claim 1, wherein said pull string installation device is made of metal.

3. The pull string installation device of claim 2, wherein said pull string installation device is made of spring wire.

4. The pull string installation device of claim 1, wherein said pull string installation device is made of plastic.

5. The pull string installation device of claim 4, wherein said pull string installation device is manufactured through an injection molding process.

6. A pull string installation device for an electrical system raceway made of metal or plastic, comprising:
   a nose portion,
   an upper leg portion having an integrally joined upper leg fish tape eyelet engaging protrusion wherein said upper leg portion is integrally and tangentially joined to said nose portion,
   a lower leg portion having an integrally joined lower leg fish tape eyelet engaging protrusion and a formed eyelet end with a pull string receiving aperture which is adapted to receive and to secure a pull string wherein said lower leg portion is integrally and tangentially joined to said nose portion.

7. The pull string installation device of claim 6, wherein said pull string installation device is made of spring wire.

8. The pull string installation device of claim 6, wherein said pull string installation device is made of plastic.

9. The pull string installation device of claim 8, wherein said pull string installation device is manufactured through an injection molding process.

10. A pull string installation device for an electrical system raceway made of spring wire, comprising:
    a nose portion,
    an upper leg portion having an integrally joined upper leg fish tape eyelet engaging protrusion wherein said upper leg portion is integrally and tangentially joined to said nose portion,
    a lower leg portion having an integrally joined lower leg fish tape eyelet engaging protrusion and a formed eyelet end with a pull string receiving aperture which is adapted to receive and to secure a pull string wherein said lower leg portion is integrally and tangentially joined to said nose portion, and wherein
    said pull string installation device can be removably engaged with an eyelet end of a fish tape having an aperture by squeezing and flexing said upper leg portion toward said lower leg portion in a manner that said integrally joined upper leg fish tape eyelet engaging protrusion and said integrally joined lower leg fish tape eyelet engaging protrusion pass through said aperture of said eyelet end of said fish tape, and wherein said pull string installation device will remain removably engaged with said eyelet end of said fish tape while inserted in a predetermined size of said electrical system raceway, and wherein
    said pull string installation device becomes disengaged from said eyelet end of said fish tape upon being removed or exiting from said electrical system raceway.

* * * * *